C. B. MUELLER.
SCORE SHEET.
APPLICATION FILED MAR. 10, 1917.

1,373,016.

Patented Mar. 29, 1921.

2 SHEETS—SHEET 1.

DUPLICATE AUCTION BRIDGE SCORE SHEET

Original | Duplicate

| NORTH AND SOUTH | | | | EAST AND WEST | | | | | | NORTH AND SOUTH | | | | EAST AND WEST | | | |
|---|---|---|---|---|---|---|---|---|---|---|---|---|---|---|---|---|---|
| Bid / Tricks Won or Set | Game | Honors and Bonus | E. & W. Penalty | Bid / Tricks Won or Set | Game | Honors and Bonus | N. & S. Penalty | | | Bid / Tricks Won or Set | Game | Honors and Bonus | E. & W. Penalty | Bid / Tricks Won or Set | Game | Honors and Bonus | N. & S. Penalty |
| 2 hearts set 1 | | 32 | | doubled | | | 100 | 1 | 1 | | | | | | | | |
| | | | | | | | | 2 | 2 | | | | | 1 no trump won 2 | | 20 | 30 |
| | | | | | | | | 3 | 3 | | | | | | | | |
| | | | | | | | | 4 | 4 | | | | | | | | |
| 3 spades won 4 | 36 | 18 | | | | | | 5 | 5 | | | | | | | | |
| | | | | | | | | 6 | 6 | | | | | | | | |
| | | | | | | | | 7 | 7 | | | | | | | | |
| | | | | | | | | 8 | 8 | | | | | | | | |
| | | | | | | | | 9 | 9 | | | | | | | | |
| 1 | 5 | 9 | 13 | 2 | 6 | 10 | 14 | 10 | 10 | 3 | 7 | 11 | 15 | 4 | 8 | 12 | 16 |
| | | | | | | | | 11 | 11 | | | | | | | | |
| | | | | | | | | 12 | 12 | | | | | | | | |
| | | | | | | | | 13 | 13 | | | | | | | | |
| | | | | | | | | 14 | 14 | | | | | | | | |
| | | | | | | | | 15 | 15 | | | | | | | | |
| | | | | | | | | 16 | 16 | | | | | | | | |
| SUM OF TOTALS 17 | TOTALS | | | SUM OF TOTALS 18 | TOTALS | | | | | SUM OF TOTALS 19 | TOTALS | | | SUM OF TOTALS 20 | TOTALS | | |
| Difference between sums 21 | | 25 | | | 22 | 26 | | | | Difference between sums 23 | | 27 | | | 24 | 28 | |

= N & S E & W  GAIN           = N & S E & W  GAIN

Gain Subtraction

Date              19

― NORTH & SOUTH
= EAST & WEST      WIN

*Fig. 1.*

Inventor:
C. B. Mueller

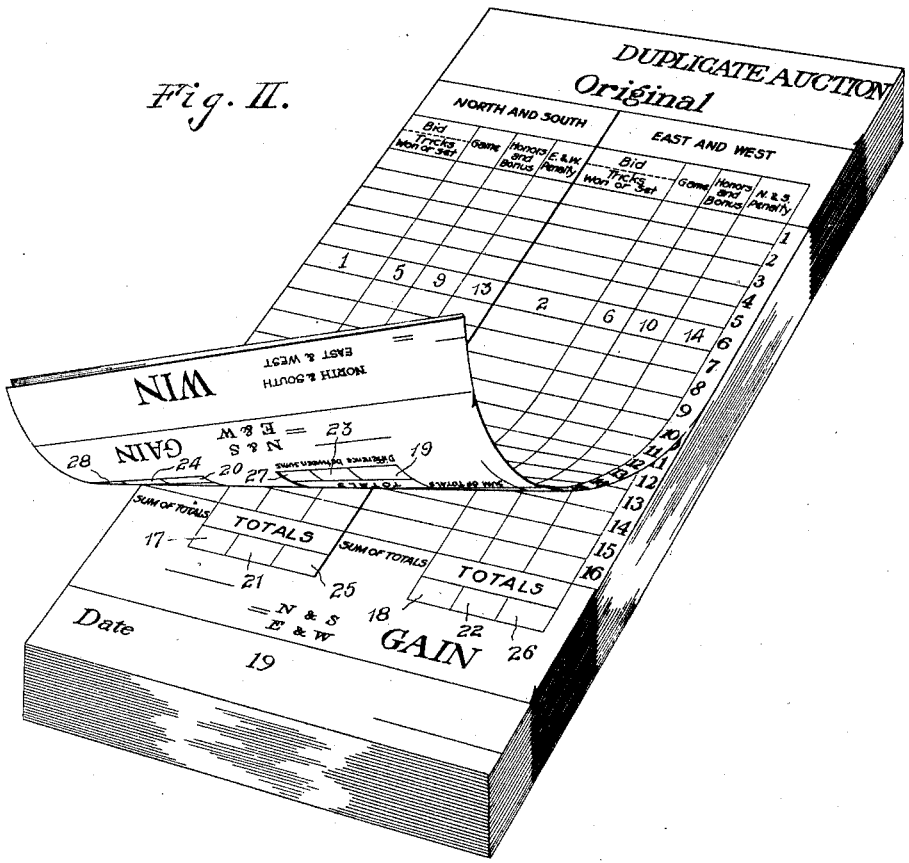

UNITED STATES PATENT OFFICE.

CURT B. MUELLER, OF CLEVELAND, OHIO.

SCORE-SHEET.

1,373,016.     Specification of Letters Patent.     Patented Mar. 29, 1921.

Application filed March 10, 1917. Serial No. 154,038.

*To all whom it may concern:*

Be it known that I, CURT B. MUELLER, a citizen of the United States, residing at Cleveland, in the county of Cuyahoga and State of Ohio, have invented a new and useful Improvement in Score-Sheets, of which the following is a specification, the principle of the invention being herein explained and the best mode in which I have contemplated applying that principle, so as to distinguish it from other inventions.

My invention pertains to a score sheet especially adapted, as exemplified by the drawing, to the card game known as duplicate auction bridge. More particularly, the invention is purposed to be useful in jotting down a record, alike for the regulation mode of playing duplicate bridge and for what is known as the "memory" system of replay of the hands.

The object of this invention it to enable a more comprehensive record or history of the hands to be quickly and simply made, so that at the conclusion of play not only the numerical results but a more detailed tabulation of the series of actual bases of play and resultant score of each hand will be available for reference. In this way moreover an absolutely reliable comparison of the different premises according to which some particular hand may have been played, is furnished and incidentally the cause of speculative argument or dispute eliminated.

I would have it expressly understood that I in no wise limit myself to this specific application or embodiment of my invention, which I have selected as a basis for illustrating and describing my invention merely for the purpose of rendering a clear and comprehensive understanding of the scope and novel features thereof.

Figure 1 of the drawing illustrates the arrangement and subject matter of a score sheet as contemplated by my invention.

Fig. 2 is a perspective view of a pad comprising a plurality of folded sheets.

It will be noticed that the sheet comprises a series of blank spaces arranged in columns each supplied with one or more headings and some together with a common heading; also that the individual spaces vary in breadth but not in height and are numbered consecutively from top to bottom. Additional blank spaces precisely defined and otherwise are furnished underneath the columns and are likewise surmounted by suitable headings. It will also be apparent at a glance that the right and left halves of the sheet are absolute duplicates of each other, while each half is itself divided to comprise a nearly but not completely duplicated arrangement. I have arbitrarily assumed sixteen hands as the number for which the particular sheet illustrated is capable of scoring after the manner of my invention.

In using my score sheet for regulation duplicate auction the entire printed area thereof should be spread out and the resulting record and score of any particular hand entered on that side of the middle and in that particular series of spaces as will hereinafter be explained by a selection of one or more fancied examples. Furthermore, the totals are not to be computed when the regulation duplicate has been played.

In using the score sheet while playing so-called "memory" duplicate auction the sheet would be creased and folded through its middle, that is, between the duplicated columns of numerals, in which position a plurality of sheets may be attached along one or more edges, as by gluing, to form a pad. It may be well to remember that according to the scheme of "memory" duplicate bridge four persons would not only play a specified number of original hands but the same four persons, similarly paired as partners, would also replay the same identical hands, each team during the duplicate round playing the series of hands which the opposing team held on the original round. It is well known that even though the duplicate round is played after a long interval of time skilled players are enabled to recall in too many instances the lay of the cards and happenings during the original play. However, many less skilful players find enjoyment in playing "memory" duplicate bridge because they make no conscious effort to strain their recollections and regard an actual exchange of hands, as between a pair of teams, as in some respects rendering a more gratifying comparison.

The two halves of the sheet are surmounted by large headings ORIGINAL and DUPLICATE and each half with sub-headings "North and south" and "East and west," which sub-headings cover all the credit spaces of the teams having their chairs so arranged to compass as has been adopted by custom.

Prior to describing the arrangement and manner of use of my invention I would state that an instance of the manner of scoring one particular hand will be traced and such hand will be assumed to be No. 5 of the original play.

It will be noticed that the sheet comprises, as already mentioned, four duplicate series of columns composed of blank spaces. Ordinarily four is sufficient though the number may, of course, be increased if for any purpose thought desirable. I have designated the larger blank spaces of that column farthest to the left by the numeral 1 and the other three columns of the same sized spaces as 2, 3 and 4 respectively in a direction from left to right. It will be observed that such columns of spaces are provided with a double heading entitled "Bid" and "Tricks won or set" indicating that in using the score sheet a double information data is to be filled in each of the spaces. For example, the scorer would fill in the final bid, say "3 spades" and just below the number of tricks which as a result of the succeeding play had actually been won or lost say, "Won 4."

The four next adjacent columns of spaces have the heading "Game" and it will be seen that the individual spaces in each column are numbered 5, 6, 7 and 8 respectively. For example, the scorer would fill in one of the spaces under the heading "Game," the number of points, if any, which had actually been scored short or in excess of a game of 30 points; in the instance assumed 36 points.

Following farther to the right the next four columns of similarly sized spaces have the heading "Honors and bonus" and the spaces thereof are numbered respectively 9, 10, 11 and 12. In such spaces are to be supplied either the separate numbers corresponding to the honor and bonus scores to which the bidders are entitled or if the scorer shall prefer the sum of both mentally computed. Of course, a bonus score such as that allowed in reward for a "big slam" or "little slam" is less frequently earned. Assuming further that in the hand which is being instanced that the bidders held 3 honors, but by reason of having won only 4 tricks did not earn a slam, the scorer would fill in the number 18 which indicates that the bidders held simple honors in spades.

Continuing yet farther to the right the next four columns are alternately provided with headings which are alike and slightly different respectively. The first column of spaces 13 has the heading "E. & W. penalty" while the corresponding column next to the right, which has the blank spaces 14, is seen to be surmounted with the heading "N. & S. penalty." Similarly, the columns of blank spaces 15 and 16 have the headings "E. & W. penalty" and "N. & S. penalty" respectively. Penalties are, of course, the exception rather than the rule and are necessarily to be credited to the score of the opposing team, so that if, for example, in the instance assumed, the "North and south" team had not made its bid of 3 spades but had, for example, won only two odd tricks instead of four the "East and west" team would have been entitled to an N. & S. penalty of 50 points, no doubling having occurred.

Below and extending across the four sets of each, composed of three narrower columns, are headings entitled "Totals" and directly below each word "Total" are three blank spaces which are in line with the three columns thereabove respectively and in which the sums of all the scores are to be figured. The four blank spaces for the totals of the game scores are designated by the numerals 17, 18, 19 and 20 respectively. The four spaces for the sum of all the honor and bonus scores are designated by the numerals 21, 22, 23 and 24 respectively. The four spaces for the sums or totals of the various penalties are designated by the numerals 25, 26, 27 and 28 respectively. Below each of the four wider columns are sub-headings entitled "Sum of totals" together with adequate space therebelow for the addition of the three sums, just to the right of each.

In using this score sheet for comparing according to "memory auction," which frankly, is naturally condemned by real experts, the difference between sums or the subtraction of the total points of one team from the total points of the other may be arithmetically calculated under the two sub-headings entitled "Difference between sums." According to which of the two teams had the larger total of points the abbreviation for the other team is to be scratched out before the word "Gain." Likewise, when playing "memory auction" one team is almost certain to gain in the original play of hands and to lose in the duplicate play of the same hands because the lay of the cards is inevitably stronger in one series than in the other. Therefore, one team will have its name scratched before the word "Gain" on one-half the sheet while the other team will have its name abbreviated before the word "Gain" scratched on the other half of the sheet with the result that, in order to reach a final determination of a numerical comparison of results, a gain subtraction must be made. To this end a small sub-heading "Gain subtraction" is supplied near the center and at the bottom of the sheet. Whereupon, the team which did not win has its name scratched to the left of the word "Win" at the bottom of the sheet.

In using this score sheet for supplying a more detailed record or history of the premises and results attending the play of each hand of the entire series the following method may be followed. A team which may be considered as the A team will remain seated in the northerly and southerly positioned seats and successively play different sets of say, four hands each with all or at least a majority of the other teams two of which will be called the B team and C team. The columns need only have four instead of sixteen blank spaces in each column and smaller pads may be used which are limited in width and arrangement to that of one-half of the sheet as shown if it be the intention to tabulate one particular set of hands at a given table. If desired the width of the sheet may be increased to include the play of another set of hands at the same table with the next visiting C team or any number of other teams. Assuming, for convenience, that the width of any sheet is merely enough to serve for the play of two hands at one table first between the A and B teams, and then between the A and C teams, the identification "Table 1" may be written adjacent the uppermost heading "ORIGINAL" and the phrase "Table 2" adjacent the main heading "DUPLICATE." The names of the teams should also be written in, namely "A team" adjacent each of the "North and south" headings and "B team" and "C team" adjacent the two available "East and west" headings respectively. In order to exemplify the manner of scoring, let us assume the following:

If in the first hand of regulation duplicate play between the A and B teams the former had bid two hearts holding four honors, but failed to win the necessary two odd tricks, indeed, after being doubled, had won only seven tricks, the scoring would appear as filled in the left side of the upper laterally extending row which is marked midway with the numeral 1. The second of the four different hands which the A team would next play with the C team might be noted as appears in the second of the laterally extending rows on the right side. It is to be understood that each team will make notation on a separate sheet of the total number of points scored as a result of its play of all sets of hands and that the sum of such totals will be there made for prize comparison. The auxiliary purpose of the sheet here described is merely to enable possible aftermath discussion to be founded on recorded fact rather than on ventured remembrances which are not infrequently at variance. The use of my sheet while, of course, entailing added notations will furnish the means of determining, in addition to bare numerical results the "reasons why" of some particular team's superiority.

I claim:—

1. A duplicate whist score sheet pad comprising a plurality of printed sheets having portions folded upon each other so as to present divisions of a given edge of each sheet along a line which is perpendicular to the line of fold, and means for securing said sheets along such line.

2. A duplicate whist score sheet comprising a space to be visually associated with distinct score items, such space including a primary particular deal designating heading, a pair of team designating headings below said deal heading and tabulative character headings in a laterally extending row under each of said team designating headings.

3. A score record sheet comprising printed matter arranged to include: a plurality of laterally extending rows of blank space divisions, each row being designated by a particular numeral and all having an equal number of separate score spaces of the same width as corresponding spaces in the row next above or below, said sheet being furthermore provided with a plurality of other blank space divisions for separate arithmetical computation figures some of which computation divisions are denominated by a particular indicia heading, said sheet also having arithmetically suggestive phrases near its bottom for the purpose specified.

4. A score sheet comprising portions having a duplicated arrangement of columns of blank spaces, each portion having a different heading, each column also having a different heading, a column of numerals alongside the spaces respectively, said portions furthermore having a plurality of laterally extending rows of separate spaces divisionally associated below said columns both of said portions also having independent spaces each entitled by a budgetary heading, the bottom of the sheet having additional space divisions denominated by different arithmetical terms.

5. A duplicate bridge whist score sheet intended to be folded during scoring use along its middle line and printed with columns of blank space divisions and duplicate groups of column headings on the folded halves of the sheet respectively, other duplicate groups of headings disposed one group on each distinct half of said sheet.

6. A duplicate bridge whist score sheet intended to be folded during scoring use along its middle line and printed with columns of blank space divisions and duplicate groups of column headings on the folded halves of the sheet respectively, other duplicate groups of headings disposed one group on each distinct half of said sheet, primary headings over said group of heads and tabulating headings below said columns.

7. A score sheet pad comprising a plurality of printed sheets of the same size and all folded along corresponding median lines, one side of said sheets being provided on each side of the fold line with printed matter, the sheet being folded so as to present the printed matter outside, and means for attaching cut edges of the folded sheets together whereby only one half of the sheet appears to view until torn from the pad and inverted or unfolded.

8. A duplicate whist score sheet provided with printed matter including; separated blank spaces for distinct score items, a primary heading for all of said spaces and indicative of the disposition of the hands of a particular deal, a pair of subordinate headings each pair for one-half of said spaces and indicative of the particular team for whose score items such equally divided spaces are to be devoted, and sets of separate item designating headings, each set being in turn subordinate to one of said team headings.

9. A duplicate whist score sheet provided with printed matter including; separated columns of blank spaces for distinct score items, a primary heading for all of said spaces and indicative of the disposition of the hands of a particular deal, a pair of subordinate headings for one-half of said spaces and indicative of the particular team for whose score items such equally divided spaces are to be devoted, duplicated sets of separate item designating headings, each set being in turn subordinate to one of said team headings, each item designating heading having reference to one of said columns.

10. A duplicate whist score sheet provided with printed matter including separated columns of blank spaces for distinct score items, a primary heading for all of said spaces and indicative of the disposition of the hands of a particular deal, a pair of subordinate headings each for one-half of said spaces and indicative of the particular team for whose score items such equally divided spaces are to be devoted, duplicated sets of separate item designating headings, each set being in turn subordinate to one of said team headings, each item designating heading having reference to one of said columns, collected spaces one from each column furthermore arranged in laterally extending rows for scoring each a particular deal, and a column of numerals one opposite each such row to indicate the number of each particular deal of the cards.

11. A score sheet pad comprising a plurality of equi-sized printed sheets folded across pairs of middle lines so as to present corresponding cut edges of each sheeet in the same plane, and means for securing said sheets at such pairs of their edges.

Signed by me, this 1st day of March, 1917.

CURT B. MUELLER.